UNITED STATES PATENT OFFICE.

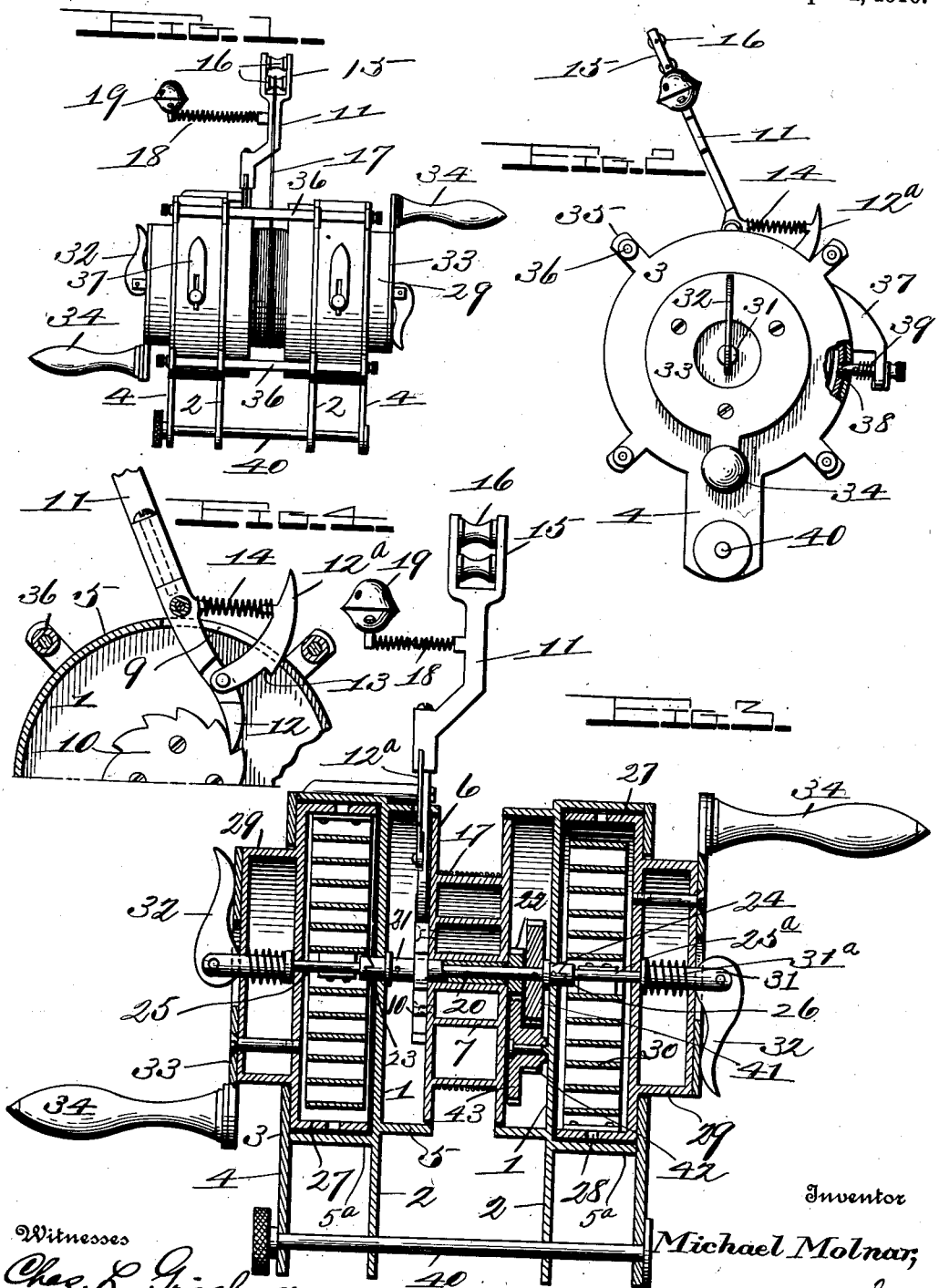

MICHAEL MOLNAR, OF MORRISTOWN, NEW JERSEY.

AUTOMATIC FISHING-REEL.

1,177,885.   Specification of Letters Patent.   Patented Apr. 4, 1916.

Application filed May 6, 1914. Serial No. 836,838.

*To all whom it may concern:*

Be it known that I, MICHAEL MOLNAR, a citizen of the United States, residing at No. 95 Speedwell avenue, in the town of Morristown, in the county of Morris and State of New Jersey, have invented a new and useful Automatic Fishing-Reel, of which the following is a specification.

This invention relates to a fish reel adapted to be secured to any suitable support, as for example some convenient portion of a boat or vessel and which will provide for automatic release of the reel when the line is drawn upon, and also to give a signal at such times, and furthermore while releasing the reel to provide a sufficient resistance and thereby regulate the speed with which the line is rewound.

The invention also consists in the novel features of construction hereinafter described, pointed out in the claims and shown in the accompanying drawings in which—

Figure 1 is a front elevation. Fig. 2 is an end view partly broken away and in section. Fig. 3 is a longitudinal vertical section. Fig. 4 is a detail sectional view illustrating a portion of the signal device.

In the drawings 1 indicates suitable circular plates having depending lugs 2 by means of which the device may be attached to a suitable rail, bar or other device. I also provide centrally cut out plates 3 having depending lugs 4 and plates 1 provided on opposite sides with flanges 5 and 5ª, respectively, the flanges 5ª engaging the plates 3 and the members 6 of a suitable reel resting within the flanges 5. The plates 1 and 3 and the flanges 5ª form suitable housings spaced apart and between which the reel 7 and its side members 6 is placed.

One of the flanges 5 is cut out as shown at 9 and to one side of the reel member 6 is secured a ratchet wheel 10. An arm 11 is pivotally mounted on the housing of which the flange 5 is a part and projects through the opening 9 terminating in a pawl 12 which engages the ratchet 10. A pivoted catch 12ª, is carried by the pawl 12 and has a shoulder 13 which is adapted to engage one edge of the slot 9 and a spring 14 normally holds said shoulder in engagement with the said edge, and when so engaged the pawl 12 is held out of engagement with the ratchet 10. The upper part of the arm 11 carries a bracket 15 in which is mounted two spools or rollers 16, and a line 17 a portion of which is wound on the reel 7 runs between these rollers. A comparatively stiff spring 18 is carried by one side of the arm 11 and to said spring is attached a bell, rattle or other form of audible signal device, 19.

The reel is mounted on a shaft 20 and upon a suitable sleeve surrounding the shaft one end portion of the shaft projects from the reel and through a pinion 22, said sleeve being indicated at 21 and being pinned to the shaft. At the end opposite the pinion the sleeve terminates in one member of a clutch 23, the other member of the clutch being carried by a shaft 25 which passes through one of the housings. A similar shaft 25ª passes through the other housing and has a clutch member 26 which coöperates with a clutch member 24 carried by the shaft 20. In each of the housings thus formed is a spring casing 27 the periphery of each being provided with a series of openings 28. Each spring casing also carries on its outer face a cylindrical housing 29 which projects through the opening of the adjacent plate 3. Suitable springs 30 are arranged in the spring casings being secured to said casings and to the shafts 25 and 25ª respectively and to the reel 7 by means of the clutch members previously referred to.

The shafts 25 and 25ª have end extensions 31 slightly larger in diameter than the remaining portions of the shaft which extensions work outwardly through the casings 29 and are bifurcated at their outer ends and in said bifurcations are pivoted cam levers 32 which when in normal position hold the clutch members above mentioned in engagement, but when thrown into horizontal position said levers will draw the extensions outwardly thereby separating said members and disengaging shaft 25 and 25ª from the shaft 20. Suitable rings 33 are secured to the casings 29 said rings being provided with suitable lugs or extensions to which handles 34 may be conveniently secured for the purpose of winding the springs. The various plates are provided with small extensions or lugs 35 through which suitable bolts or locking bars 36 may be passed for the purpose of firmly securing the two housings together. On the front of each housing is cast a bracket 37 and each housing is provided with an opening 38 through which works a spring pressed pin 39, these pins being mounted in the brackets 37 and being adapted to engage the openings 28 preventing reverse rotation of the spring casings 27.

A bar or bolt 40 passes through the lugs 2 and through any suitable bar, rail, block or other form of support upon which the reel may be mounted. A gear 41 mounted on the shaft 20 meshes with a pinion 42 carried on the side of the plate 2, and which is on a stub shaft upon which is also mounted a gear 43 that meshes with the pinion 22.

On the extensions 31 are placed coil springs 31$^a$ which normally hold the clutch members together, they being separated against pressure of said springs by the action of the cam levers 32, when thrown in horizontal position.

The pinion 22 is secured or fixed in any suitable manner to the reel 7 while the large gear 41 is fixed to the shaft 20 to turn with the sleeve 21, and the gear 43 is secured to the pinion 42 or they may be made integral as shown.

In use the reel is fastened to one side of a boat, or on land to a suitable tripod or stand by means of the lugs 2 and 4, with the arm 11 extending toward the water. The line 17 is wound on the reel between the two gear houses and passes from the reel directly between the rollers 15 and 16. Before casting the line arm 11 is pushed forward thereby locking pawl 12 in engagement with the ratchet wheel 10 and bringing the shoulder 13 of the pawl 12$^a$ into engagement with an end of slot 9. To release the line cam levers 32 are moved outwardly or dropped into horizontal position, which releases clutch 24 and the reel. This is effected by springs 31$^a$ removing clutch members 26 from the members 24 and disconnecting them from shaft 25. After casting the line the cam levers are returned to original position and arm 11 drawn back by hand which prevents further releasing of the line. The springs 30 are then wound up by means of the handles 34. The device is then ready for fishing. A bite or pull on the bait trips the arm 11 releasing the pawl 12 from the ratchet 10 and at the same time returns the shoulder 13 to the slot 9 where it is again locked. This movement is signaled by the bell 19. The springs 30 now being released rotate the reel and draw in the fish. The pins 39 prevent the spring from flying back suddenly by dropping into the openings 28, which are spaced regularly about the spring casings.

The gear wheels 22 and 42 by increasing the number of revolutions required to wind the line prevent the fish being drawn in too rapidly.

While one coil spring would be sufficient in river work with small fish, two are considered better for deep sea fishing.

What I claim is:—

1. A device of the kind described comprising spring housings spaced apart, a reel mounted between said housings, springs in the housing, shafts for said springs, a shaft for the reel, clutch members carried respectively by the spring shafts and the reel shaft, speed increasing gearing coöperating with the reel shaft, means for separately winding said springs, means for separately actuating the clutches connecting the spring shaft with the reel shaft, and means for locking said reel against rotation, said locking means being released by pull upon a line wound upon said reel.

2. A spring actuated reel comprising housings spaced apart, means for connecting said housings and holding them in fixed position, a rotatable reel arranged between the housings and partially inclosed therein, a shaft for said reel, springs in said housings, means for connecting said springs to said reel, gearing interposed between the shaft and reel, means for locking said reel against said rotation, and alarm device carried by said locking means, said means being agitated upon release of the locking means, and a line windable on said reel and engaging said locking device and adapted to trip the same when pulled on.

MICHAEL MOLNAR.

Witnesses:
 AGNES M. BEAN,
 JAMES R. NOORLIUS.